US00RE37601E

(19) United States
(12) Reissued Patent
Eastridge et al.

(10) Patent Number: US RE37,601 E
(45) Date of Reissued Patent: Mar. 19, 2002

(54) METHOD AND SYSTEM FOR INCREMENTAL TIME ZERO BACKUP COPYING OF DATA

(75) Inventors: Lawrence Elwood Eastridge; Robert Frederic Kern, both of Tucson; James Mitchell Ratliff, Benson, all of AZ (US)

(73) Assignee: International Business Machines Corporation, Armonk, NY (US)

(21) Appl. No.: 08/559,509

(22) Filed: Nov. 15, 1995

Related U.S. Patent Documents

Reissue of:
(64) Patent No.: 5,263,154
Issued: Nov. 16, 1993
Appl. No.: 07/871,466
Filed: Apr. 20, 1992

(51) Int. Cl.[7] ..... G06F 11/00
(52) U.S. Cl. ..... 714/6; 711/100
(58) Field of Search ..... 395/425, 182.04, 395/182.13; 364/268.1, 268.3; 714/6; 711/162, 114, 100

(56) References Cited

U.S. PATENT DOCUMENTS 5,051,887 A * 9/1991 Berger et al. ..... 711/162
5,155,835 A * 10/1992 Belsan ..... 711/114
5,276,860 A * 1/1994 Fortier et al. ..... 714/6

OTHER PUBLICATIONS

Running MS–DOS by Van Wolverton ©1989 by Microsoft Press, pp. 160–162 and 421–424.*

* cited by examiner

*Primary Examiner*—Albert Decady
*Assistant Examiner*—David Ton
(74) *Attorney, Agent, or Firm*—Manny W. Schecter; Bracewell & Patterson, L.L.P.

(57) ABSTRACT

Backup copying of designated datasets representing a first selected point in time consistency may be performed in a data processing system on an attached storage subsystem concurrent with data processing system application execution by first suspending application execution only long enough to form a logical-to-physical address concordance, and thereafter physically backing up the datasets on the storage subsystem on a scheduled or opportunistic basis. An indication of each update to a selected portion of the designated datasets which occurs after the first selected point in time is stored and application initiated updates to uncopied designated datasets are first buffered. Thereafter, sidefiles are made of the affected datasets, or portions thereof, the updates are then written through to the storage subsystem, and the sidefiles written to an alternate storage location in backup copy order, as controlled by the address concordance. At a subsequent point in time only those portions of the designated datasets which have been updated after the first selected period and time are copied, utilizing an identical technique.

10 Claims, 4 Drawing Sheets

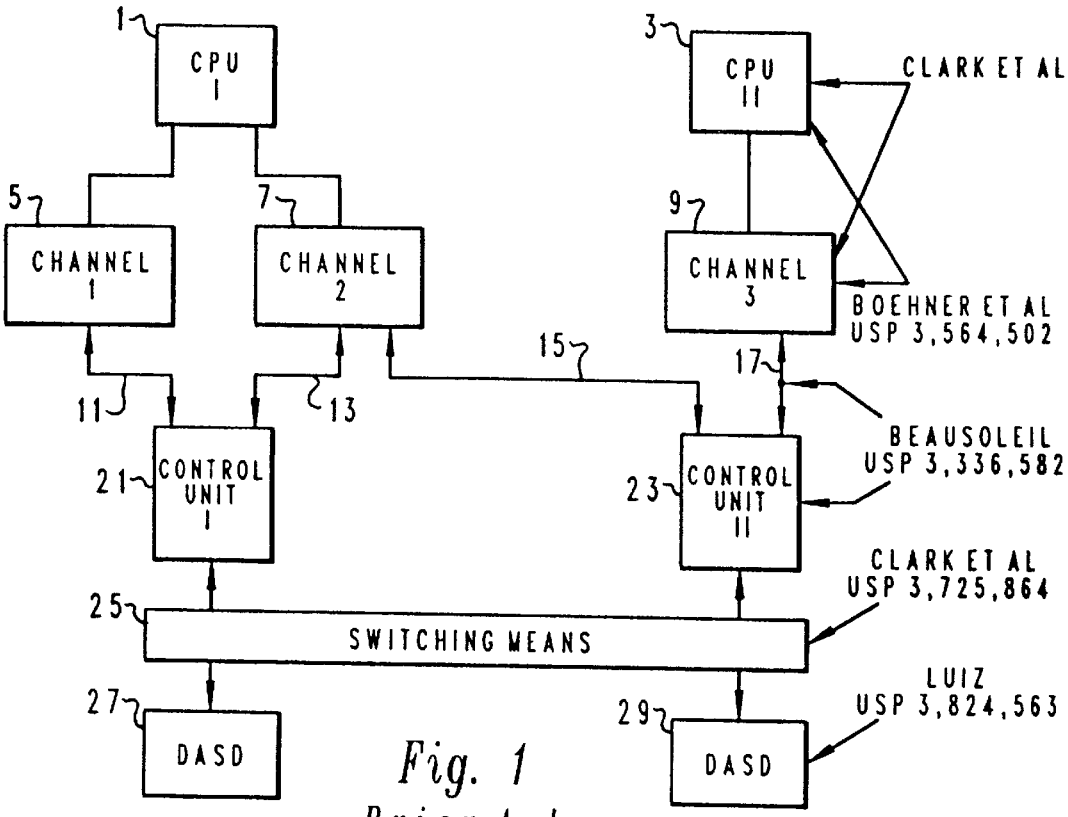
*Fig. 1*
*Prior Art*
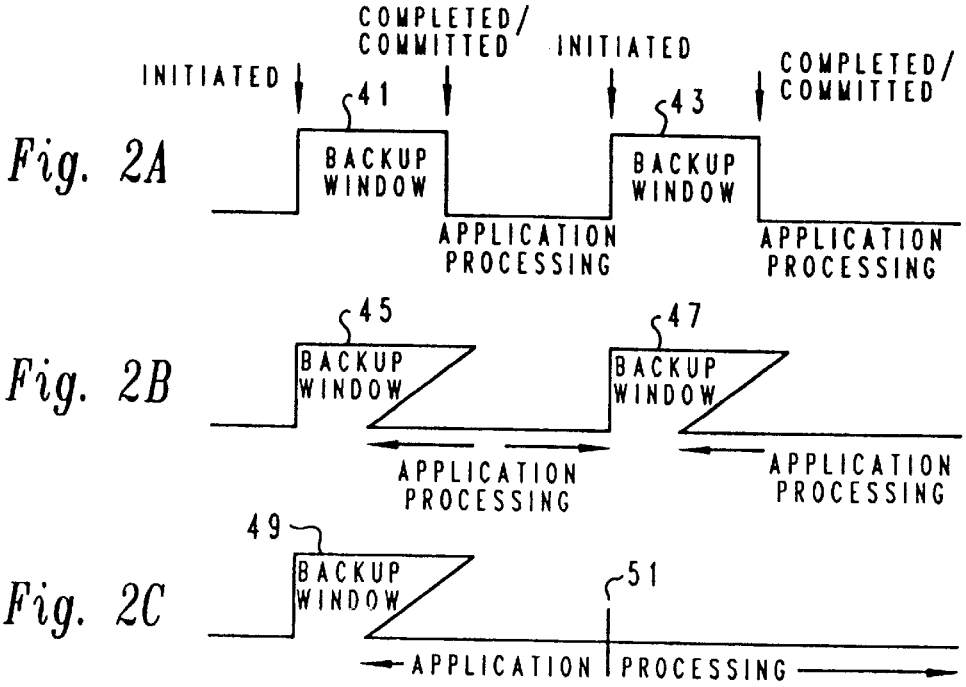
*Fig. 2A*
*Fig. 2B*
*Fig. 2C*

METHOD AND SYSTEM FOR INCREMENTAL TIME ZERO BACKUP COPYING OF DATA

Matter enclosed in heavy brackets [ ] appears in the original patent but forms no part of this reissue specification; matter printed in italics indicates the additions made by reissue.

CROSS-REFERENCE TO RELATED APPLICATION

The present application is related to U.S. patent application Ser. No. 07/781,044, entitled Method and Means for Time Zero Backup Copying of Data, filed Oct. 18, 1991, and assigned to the assignee herein named. The contents of the cross-reference United States Patent Application are hereby incorporated herein by reference thereto.

BACKGROUND OF THE INVENTION

1. Technical Field:

This invention relates in general to methods and systems for maintaining continued availability of datasets in external storage associated with accessing data processing systems, and in particular the present invention relates to backup copying of records in external storage concurrent with a dramatically shortened suspension of data processing system application execution occasioned by such copying. Still more particularly, the present invention relates to a method and system for incremental backup copying of records in a data processing system which minimizes still further the suspension of data processing system application execution during such copying.

2. Description of the Related Art:

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multiprocessing, multiprogramming facility, relative to other types of processing.

Applications executed within a data processing system are typically executed in either a batch (streamed) or interactive (transactional) mode. In a batch mode, usually one application at a time executes within interruption. Interactive mode is characterized by interrupt driven multiplicity of applications or transactions.

When a data processing system is in the process of backing up data in either a streamed or batch mode system, each process, task or application within the data processing system is affected. That is, the processes supporting streamed or batch mode operations are suspended for the duration of the copying. Those skilled in the art will recognize that this event is typically referred to as a "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/data base at a single point in time. Rather, a log comprises an event file requiring further processing against the database.

A co-pending U.S. patent application Ser. No. 07/385,647, filed Jul. 25, 1989, entitled A Computer Based Method For Dataset Copying Using an Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault, in order to exhibit a point in time consistency.

U.S. Pat. No. 4,507,751, Gawlick et al., entitled Method and Apparatus for Logging Journal Data Using a Write Ahead Dataset, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled Method and Apparatus for Executing Critical Disk Access Commands, teaches the performance of media maintenance on selected portions of a tracked cyclic operable magnetic media concurrent with active access to other portions of the storage media. The method described therein requires the phased movement of customer data between a target track to an alternate track, diversion of all concurrent access requests to the alternate track or tracks and the completion of maintenance and copy back from the alternate to the target track.

Requests and interrupts which occur prior to executing track-to-track customer data movement result in the restarting of the process. Otherwise, requests and interrupts occurring during execution of the data movement view a DEVICE BUSY state. This typically causes a requeueing of the request.

It should therefore be apparent that a need exists for a method and system whereby the maximum availability of application execution within a data processing system is maintained while creating backup copies which exhibit a consistent view of data within an associated database, as of a specific time.

SUMMARY OF THE INVENTION

It is therefore one object of the present invention to provide an improved method and system for maintaining continued availability of datasets in external storage associated with accessing data processing systems.

It is another object of the present invention to provide an improved method and system for backup copying of records in external storage concurrent with a dramatically shortened suspension of data processing system application execution occasioned by such copying.

It is yet another object of the present invention to provide an improved method and system for incremental backup copying of records in a data processing system which minimizes, still further the suspension of data processing system application execution during such copying, as well as the actual amount of data which must be backed up.

The foregoing objects are achieved as is now described. Backup copying of designated datasets representing a first selected point in time consistency may be performed in a data processing system on an attached storage subsystem concurrent with data processing system application execution by first suspending application execution only long enough to form a logical-to-physical address concordance, and thereafter physically backing up the datasets on the storage subsystem on a scheduled or opportunistic basis. An indication of each update to a selected portion of the designated datasets which occurs after the first selected point in time is stored and application initiated updates to uncopied designated datasets are first buffered. Thereafter, sidefiles are made of the affected datasets, or portions thereof, the updates are then written through to the storage subsystem, and the sidefiles written to an alternate storage location in backup copy order, as controlled by the address concordance. At a subsequent point in time only those portions of the designated datasets which have been updated after the first selected period and time are copied, utilizing an identical technique.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a typical multiprocessing, multiprogramming environment according to the prior art where executing processors and applications randomly or sequentially access data from external storage;

FIGS. 2A–2C depict time line illustrations of the backup window in a batch or streaming process in the prior art, in a time zero backup system and in an incremental time zero backup system, respectively;

DETAILED DESCRIPTION OF PREFERRED EMBODIMENT

Figure 3:
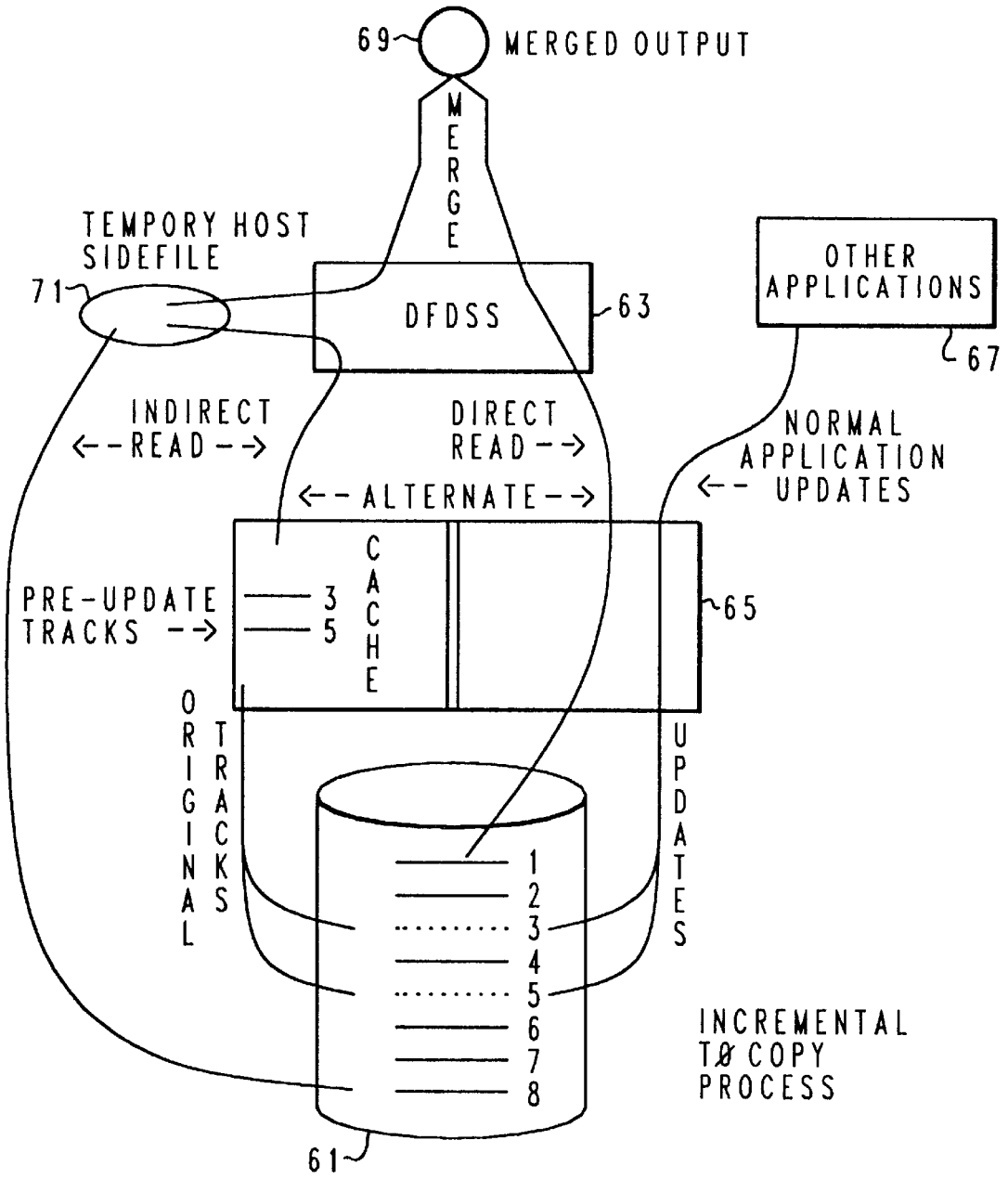
FIG. 3 illustrates a conceptual flow of an incremental time zero backup copy in accordance with the method and system of the present invention.

With reference now to the figures and in particular with reference to FIG. 1, there is depicted a multiprocessing, multiprogramming data processing system according to the prior art. Such systems typically include a plurality of processors 1 and 3 which access external storage units 21, 23, 25, 27, and 29 over redundant channel demand/response interfaces 5, 7 and 9.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled Data Processing System, issued on Sep. 3, 1968. A configuration in which multiple processors share access to external storage units is set forth in Luiz et al., U.S. Pat. No. 4,207,609, entitled Path Independent Device Reservation and Reconnection in a Multi-CPU and Shared Device Access System, issued Jan. 10, 1980.

The MVS operating system is also described in IBM Publication GC28-1150, entitled MVS/Extended Architecture System Programming Library; System Macros and Facilities, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Referring now to FIGS. 2A–2C, there are depicted time lines illustrating the backup window in a batch or streaming process in the prior art, in a time zero backup system and in an incremental time zero backup system respectively. As illustrated at FIG. 2A, multiple backup operations have occurred, as indicated at backup windows 41 and 43. Application processing is typically suspended or shut down just prior to each backup window and this suspension will persist until the backup process has been completed. Termination of the backup window signifies completion of the backup process and commitment. By "completion" what is meant is that all data that was to have been copied was in fact read from the source. By "commitment" what is meant is that all data to be copied was in fact written to an alternate storage location.

Referring now to FIG. 2B, backup windows for a time zero backup copy system are depicted. As described in detail within the copending cross-referenced patent application, each backup window 45 and 47 still requires the suspension or termination of application processing; however, the suspension or termination occurs only for a very short period of time. As described in the cross-referenced application, the time zero backup method begins, effectively freezing data within the datasets to be backed up at that point in time. Thereafter, a bit map is created identifying each track within the datasets to be backed up and after creation of that bit map, the copy is said to be "logically complete." The committed state, or "physically complete" state will not occur until some time later. However, at the "logically complete" point in time, the data is completely usable by applications within the data processing system. The time during which application processing is suspended in such a system is generally in the low subsecond range; however, those skilled in the art will appreciate that the amount of time required to create a bit map to the data to be copied will depend upon the amount of data within the datasets.

Of course, those skilled in the art will appreciate that if the time zero backup process terminates abnormally between the point of logical completion and the point of physical completion, the backup copy is no longer useful and the process must be restarted. In this respect, the time zero backup process is vulnerable in a manner very similar to that of backup systems in the prior art. That is, all backup operations must be rerun if the process terminates abnormally prior to completion.

Referring now to FIG. 2C, the incremental time zero backup copying process is depicted. As above, an initial backup window 49 exists which requires a temporary suspension or termination of application processing; however, in a manner which will be explained in greater detail herein, updates to the dataset which occur after the initial backup copy has begun are tracked utilizing an alternate bit map of the designated dataset. Thereafter, only those tracks within the designated dataset which have been altered are copied during a subsequent incremental copy session. Since the creation of a bit map identifying those tracks within the dataset which have been updated since a previous full copy has been completed occurs during the update process, application processing need not be suspended until the next time a full copy is desired. In this manner, suspension or interruption of application processing is substantially reduced.

With reference now to FIG. 3, there is depicted a conceptual flow of the creation of an incremental time zero backup copy in accordance with the method and system of the present invention. As illustrated, an incremental time zero backup copy of data within a tracked cyclic storage device 61 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of explanation of this invention, backup processing will be described as managed both at the resource manager level within a data processing system and at the storage control unit level.

As described above, each processor typically includes an operating system which includes a resource manager component. Typically, an IBM System 370 type processor running under the MVS operating system will include a resource manager of the data facilities dataset services (DFDSS) type which is described in U.S. Pat. No. 4,855,907, Ferro et al., issued Aug. 8, 1989, entitled Method for Moving VSAM Base Clusters While Maintaining Alternate Indices Into the Cluster. DFDSS is also described in IBM Publication GC26-4388, entitled Data Facility Dataset Services: User's Guide. Thus, a resource manager 63 is utilized in conjunction with a storage control unit 65 to create an incremental backup copy of designated datasets stored within tracked cyclic storage device 61.

As will be described below, the backup copy process includes an initialization period during which datasets are sorted, one or more bit maps are created and logical completion of the bit map is signaled to the invoking process at the processor. The listed or identified datasets are then sorted according to access path elements down to DASD track granularity. Next, bit maps are constructed which correlate the dataset and the access path insofar as any one of them is included or excluded from a given copy session. Lastly, storage manager 63 signals logical completion, indicating that updates will be processed against the dataset only after a short delay until such time as physical completion occurs.

Following initialization, storage manager 63 begins reading the tracks of data which have been requested. While a copy session is active, each storage control unit monitors all updates to the dataset. If an update is received from another application 67, storage control unit 65 will execute a predetermined algorithm to process that update, as described below.

In a time zero backup copy system a determination is first made as to whether or not the update attempted by application 67 is for a volume which is not within the current copy session. If the volume is not within the current copy session, the update completes normally. Alternately, if the update is for a volume which is part of the copy session, the primary session bit map is checked to see if that track is protected. If the corresponding bit within the bit map is off, indicating the track is not currently within a copy session, the update completes normally. However, if the track is protected (the corresponding bit within the bit map is on) the track in question is part of the copy session and has not as yet been read by the storage manager 63. In such a case, storage control unit 65 temporarily buffers the update and writes a copy of the affected track from tracked cyclic storage device 61 into a memory within storage control unit 65. Thereafter, the update is permitted to complete.

Thus, as illustrated in FIG. 3, an update initiated by application 67 may be processed through storage control unit 65 to update data at tracks 3 and 5 within tracked cyclic storage unit 61. Prior to permitting the update to occur, tracks 3 and 5 are written as sidefiles to a memory within storage control unit 65 and thereafter, the update is permitted to complete. The primary bit map is then altered to indicate that the copies of tracks 3 and 5, as those tracks existed at the time a backup copy was requested, are no longer within the tracked cyclic storage device 61 but now reside within a memory within storage control unit 65.

A merged copy, representing the designated dataset as of the time a backup copy was requested, is then created at reference numeral 69, by copying non-updated tracks directly from tracked cyclic storage device 61 through resource manager 63, or by indirectly copying those tracks from tracked cyclic storage device 61 to a temporary host sidefile 71, while may be created within the expanded memory store of a host processor. Additionally, tracks within the dataset which have been written to sidefiles within a memory in storage control unit 65 prior to completion of an update may also be indirectly read from the memory within storage control unit 65 to the temporary host sidefile 71. Those skilled in the art will appreciate that in this manner a copy of a designated dataset may be created from unaltered tracks within tracked cyclic storage device 61, from updated tracks stored within memory of storage control unit 65 and thereafter transferred to temporary host sidefile 71, wherein these portions of the designated dataset may be merged in backup copy order, utilizing the bit map which was created at the time the backup copy was initiated.

Figure 4:
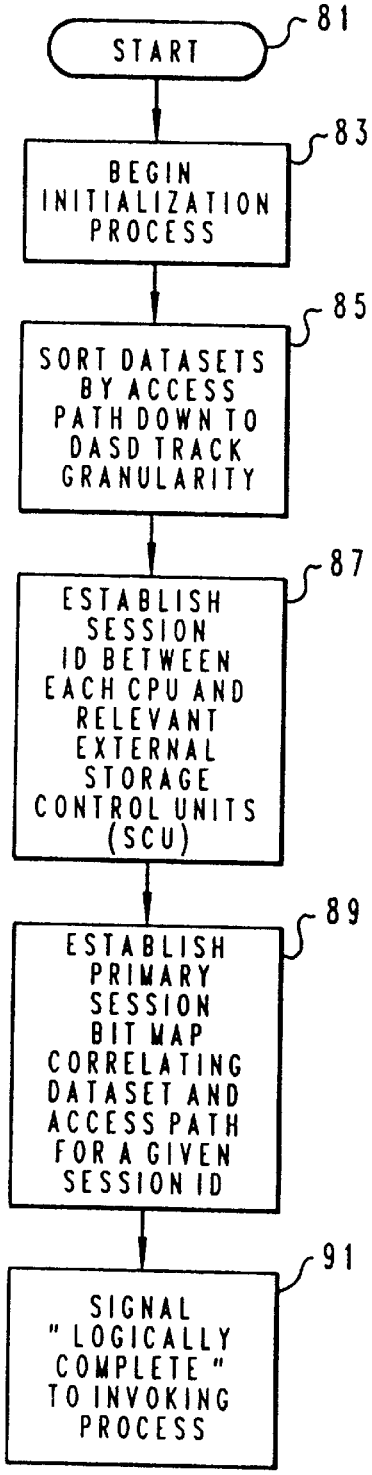
FIG. 4 is a high level logic flowchart illustrating initialization of an incremental time zero backup copy in accordance with the method and system of the present invention.

Referring now to FIG. 4, there is depicted a high level logic flowchart which illustrates the initialization of a process for creating an incremental time zero backup copy, in accordance with the method and system of the present invention. As illustrated, this process starts at block 81 and thereafter passes to block 83 which illustrates the beginning of the initialization process. Thereafter, the process passes to block 85 which depicts the sorting of the datasets by access path, down to DASD track granularity. This sorting process will, necessarily, resolve an identification of the DASD volumes within which the datasets reside and the identification of the storage control units to which those volumes belong.

Next, as depicted at block 87, a session identification is established between each processor and the relevant external storage control units. The session identification is preferably unique across all storage control units, in order that multiple processors will not interfere with each others' backup copy processes. Thereafter, as illustrated at block 89, a primary session bit map is established which may be utilized, as set forth in detail herein and within the cross-reference patent application, to indicate whether or not a particular track is part of the present copy session. Thereafter, as depicted at block 91, the "logically complete" signal is sent to the invoking process, indicating that application processing may continue; however, slight delays in updates will occur until such time as the backup copy is physically complete.

Figure 5:
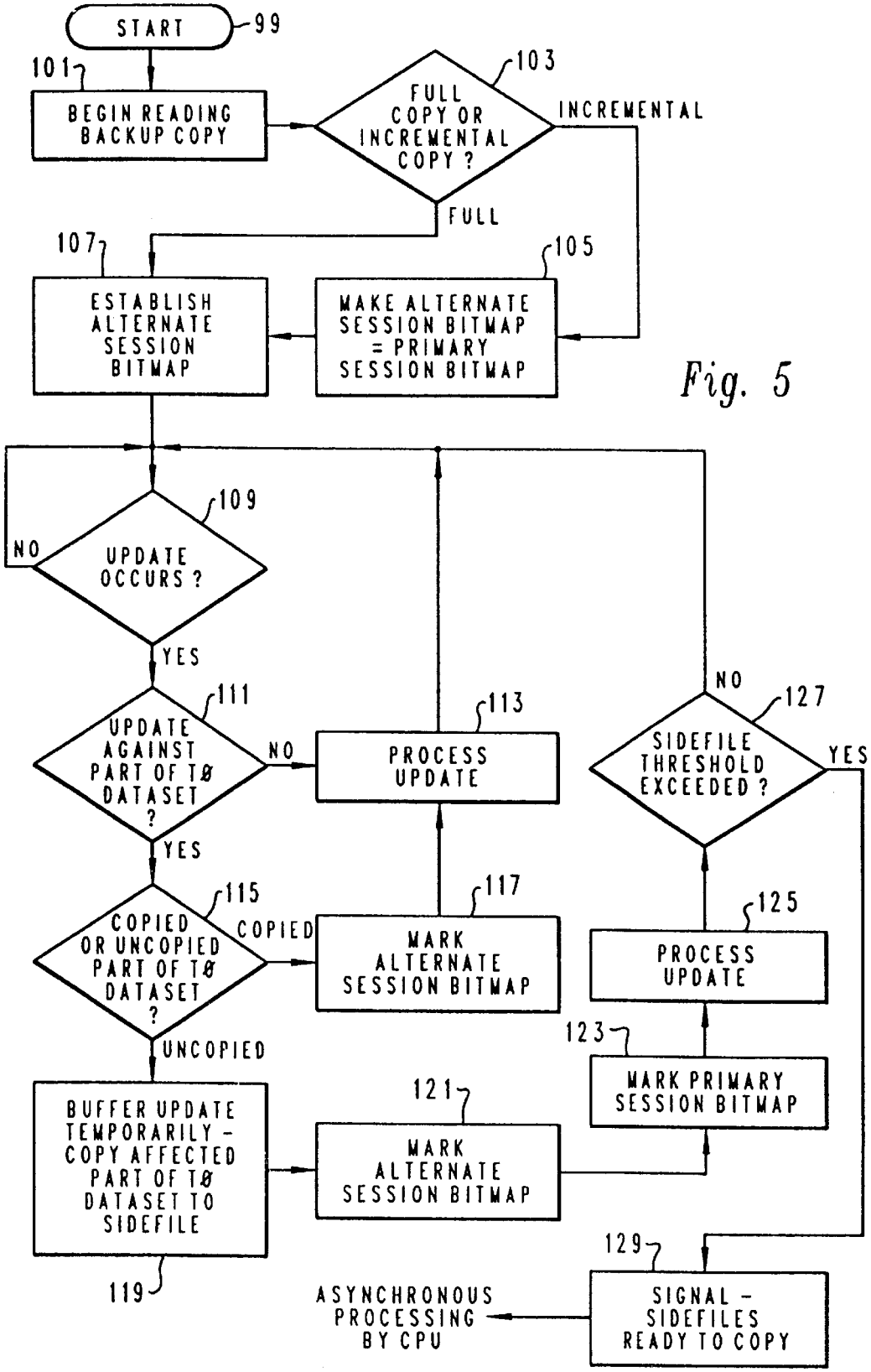
FIG. 5 is a high level logic flowchart illustrating incremental backup copying in accordance with the method and system of the present invention.

With reference now to FIG. 5, there is depicted a high level logic flowchart which illustrates the incremental backup copying of a dataset in accordance with the method and system of the present invention. As illustrated, the process begins at block 99 and thereafter passes to block 101. Block 101 depicts the beginning of the reading of a backup copy. The process then passes to block 103 which illustrates a determination of whether or not the backup copy is to be a "FULL" copy or a "INCREMENTAL" copy. As described above, a FULL copy is a copy of each element within a designated dataset, regardless of whether or not the data within the dataset has been previously altered. An INCREMENTAL copy is a copy which only includes those portions of the dataset which have been updated or altered since the previous backup copy occurred.

Still referring to block 103, in the event a FULL copy is to be created, the process passes to block 107 which depicts the establishment of an alternate session bit map. As will be described in greater detail herein, an alternate session bit map is utilized to track alterations or updates to portions of the designated dataset which occur after the initiation of a previous backup copy, such that an INCREMENTAL copy of only those portions of the dataset which have been altered may be created at a subsequent time. Alternately, in the event an INCREMENTAL copy is to be created, the process passes from block 103 to block 105, which illustrates the changing of the designation of the alternate session bit map to that of the primary session bit map, and the process then passes to block 107, which again illustrates the establishment of an alternate session bit map.

Thus, upon the initiation of a FULL backup copy, an alternate session bit map is created to track changes to the dataset which occur after the initiation of the full copy. Thereafter, if an INCREMENTAL copy is to be created, the previously established alternate session bit map is utilized as the primary session bit map and a new alternate session bit map is created to permit the system to track changes to the data within the dataset which occur after the initiation of the INCREMENTAL copy.

Next, block 109 illustrates a determination of whether or not an update has occurred. In the event no update has occurred, the process merely iterates until such time as an update does occur. In the event an update has occurred, the process passes to block 111. Block 111 illustrates a determination of whether or not the update initiated by an application within the data processing system is an update against a portion of the time zero dataset. If not, the process merely passes to block 113 and the update is processed in a user transparent fashion. However, in the event the update is against a portion of the time zero dataset, the process passes to block 115.

Block 115 illustrates a determination of whether or not the update is against a copied or uncopied portion of the time zero dataset. That is, an update to a portion of data within the dataset which has been copied to the backup copy and is therefore physically complete, or a portion which has not yet been copied to the backup copy. If the portion of the dataset against which the update is initiated has already been copied to the backup copy, the process passes to block 117 which illustrates the marking of the alternate session bit map, to indicate that this portion of the dataset has been altered since the previous backup copy was initiated. Thereafter, the process passes to block 113 which illustrate the processing of the update. Again, the process then passes from block 113 to block 109, to await the occurrence of the next update.

Referring again to block 115, in the event the update against the time zero dataset is initiated against a portion of the time zero dataset which has not yet been copied to the backup copy, the process passes to block 119. Block 119 illustrates the temporary buffering of the update and the copying of the affected portion of the time zero dataset to a sidefile within memory within the storage control unit (see FIG. 3). Thereafter, the process passes to block 121, which illustrates the marking of the alternate session bit map to indicate that an update has occurred with respect to this portion of the dataset since the initiation of the previous backup copy.

Next, the process passes to block 123, which illustrates the marking of the primary session bit map, indicating to the resource manager that this portion of the dataset has been updated within the external storage subsystem and that the time zero copy of this portion of the dataset is now either within cache memory within storage control unit 65 or within temporary host sidefile 71 which is utilized to prevent overflow of data within the cache memory within storage control unit 65 (see FIG. 3).

After marking the primary session bit map, the process passes to block 125 which illustrates the processing of that update. Thereafter, the process passes to block 127 which depicts a determination of whether or not the sidefile threshold within the cache memory of storage control unit 65 has been exceeded. If so, the process passes to block 129, which illustrates the generation of an attention signal, indicating that sidefiles within the storage control unit are ready to be copied by the processor. Of course, those skilled in the art will appreciate that a failure to copy data from the cache memory within storage control unit 65 may result in the corruption of the backup copy if that memory is overwritten. Referring again to block 127, in the event the sidefile threshold has not been exceeded, the process returns again to block 109 to await the occurrence of the next update.

The asynchronous copying of sidefile data from a cache memory within storage control unit 65 to a temporary host sidefile, or to the merged backup copy, is described in detail within the cross-referenced patent application, as well as the process by which merged copies are created which incorporate data read directly from tracked cyclic storage unit 61, data within cache memory within storage control unit 65 and/or data within temporary host sidefile 71.

Thus, upon reference to the foregoing those skilled in the art will appreciate that by initiating a time zero backup copy the suspension of application execution which normally accompanies a backup copy session is substantially reduced by the expedient of creating a bit map identifying each portion of data within the designated dataset to be updated and thereafter releasing the dataset for application execution. Portions of the designated dataset within the external storage subsystem are then copied on an opportunistic or scheduled basis and attempted updates to the data contained therein are deferred temporarily, until such time as the original data, as it existed as of the time of the backup copy, may be written to a sidefile for inclusion within the completed backup copy. Thereafter, the updates are written to the data within the external storage subsystem.

The method and system of the present invention may be utilized to create an alternate bit map which is automatically established each time an update occurs or the system begins reading a backup copy. This alternate bit map is then utilized to track alterations to the data which occurs after the initial backup copy is created and, at subsequent backup points, this bit map is utilized to facilitate the copying of only those portions of the designated dataset which have been updated since the previous backup copy was created. At the initiation of a subsequent INCREMENTAL copy, this alternate bit map becomes the primary bit map and another alternate bit map is created to track alterations or updates which occur to the data after the INCREMENTAL copy is initiated. In this manner, the termination or suspension of application execution within a data processing system during backup copying is substantially eliminated. For example, those skilled in the art will appreciate that sidefiles of affected tracks generated as a result of an update prior to physical completion may be stored within a cyclic tracked storage device at an unusual location, rather than in memory within the storage control unit, as depicted in the illustrated embodiment.

While the invention has been particularly shown and described with reference to a preferred embodiment, it will be understood by those skilled in the art that various changes in form and detail may be made therein without departing from the spirit and scope of the invention.

We claim:

1. A method in a data processing system for incremental backup copying of designated datasets stored within one or more storage subsystems coupled to said data processing system during application execution within said data processing system, said method comprising the steps of:

suspending application execution within said data processing system at a first point in time, forming a dataset logical-to-physical storage system address concordance for said designated datasets and resuming application execution thereafter;

physically backing up said designated datasets within said one or more storage subsystems on a scheduled or opportunistic basis by copying said designated datasets from said one storage subsystems to alternate storage subsystem locations;

storing an indication of each application initiated update to said designated datasets which occurs after said first point in time;

processing at said one or more storage subsystems any application initiated updates to uncopied designated datasets by buffering said updates, writing sidefiles of said designated datasets or portions thereof affected by said updates, writing said updates to said one or more storage subsystems, and copying on a scheduled or opportunistic basis said sidefiles to said alternate storage subsystem location in conjunction with said copied designated datasets from said one more storage subsystems in an order defined by said address concordance; and creating an incremental backup copy of said designated datasets at a designated time subsequent to said first point in time by copying only those designated datasets or portions thereof updated after said first point in time.

2. The method in a data processing system for incremental backup copying of designated datasets stored within one or more storage subsystems coupled to said data processing system according to claim 1, wherein said step of creating an incremental backup copy of said designated datasets comprises the steps of:

forming a second dataset logical-to-physical storage system address concordance at said designated time for each designated dataset or portion thereof updated after said first point in time;

physically backing up said designated datasets updated after said first point in time on a scheduled or opportunistic basis by copying said designated datasets updated after said first point in time from said one or more storage subsystems to alternate storage subsystem locations; and processing at said one more storage subsystems any application initiated updates to uncopied designated datasets previously updated after said first point in time by buffering said updates, writing sidefiles of said designated datasets of portions thereof affected by said updates, writing said updates to said one or more storage subsystems, and copying on a scheduled or opportunistic basis said sidefiles to said alternate storage location in conjunction with said copied designated datasets in an order defined by said second address concordance.

3. A method in a data processing system for incremental backup copying of designated datasets stored within one or more tracked cyclic storage devices coupled to said data processing system during application execution within said data processing system, said method comprising the steps of:

suspending application execution within said data processing system at a first point in time in response to a request for a backup copy of at least one dataset stored within said one or more tracked cyclic storage devices;

forming a dataset and device track concordance for said at least one dataset and signaling said data processing system of the completion thereof;

resuming application execution within said data processing system in response to said completion signal;

copying said at least one dataset from said one or more tracked cyclic storage devices on a scheduled or opportunistic basis to an alternate storage subsystem;

storing an indication of each application initiated update to any portion of said at least one dataset which occurs after said first point in time;

processing application initiated updates to uncopied portions of said at least one dataset by buffering said updates, writing sidefiles of said affected portions of said at least one dataset, writing said updates to said one or more tracked cyclic storage devices and copying said sidefiles to said alternate storage location; and creating an incremental backup copy of said at least one dataset at a designated time subsequent to said first point in time by copying to said alternate storage system location only those portions of said at least one dataset which have been updated after said first point in time.

4. A data processing system for performing incremental backup copying of designated datasets stored within one or more storage subsystems coupled to said data processing subsystem during application execution within said data processing system, said data processing system comprising:

means for suspending application execution within said data processing system at a first point in time;

means for forming a dataset logical-to-physical storage system address concordance for said designated datasets at said first point in time;

means for resuming application execution thereafter;

means for physically backing up said designated datasets within said one or more storage subsystems on a scheduled or opportunistic basis by copying said designated datasets from said one storage subsystems to alternate storage subsystem locations;

means for storing an indication of each application initiated update to said designated datasets which occurs after said first point in time;

means for processing at said one or more storage subsystems any application initiated updates to uncopied designated datasets by buffering said updates, writing sidefiles of said designated datasets or portions thereof affected by said updates, writing said updates to said one or more storage subsystems, and copying on a scheduled or opportunistic basis said sidefiles to said alternate storage subsystem location in conjunction with said copied designated datasets from said one more storage subsystems in an order defined by said address concordance; and means for creating an incremental backup copy of said designated datasets at a designated time subsequent to said first point in time by copying only those designated datasets or portions thereof updated after said first point in time.

5. A storage control unit having a cache memory for permitting incremental backup copying of designated datasets stored within a storage subsystem associated therewith by a data processing system coupled thereto, said storage control unit comprising:

means for forming a dataset logical-to-physical storage address concordance for said designated datasets within said storage subsystem at a first point in time;

means for permitting copying of said designated datasets within said stored designated datasets on a scheduled or opportunistic basis by said data processing system;

means for storing an indication of each update to a portion of said designated datasets which occurs after said first point in time;

means for processing updates to uncopied portions of said designated datasets by buffering said updates, writing sidefiles of said uncopied portions of said designated datasets affected by said updates within said cache memory and writing said updates into said associated storage subsystems;

means for permitting copying of said sidefiles by said data processing system; and means for permitting selective copying at a designated time after said first point in time of said portions of said designated datasets updated after said first point in time.

*6. A computer program product for use in a data processing system for incremental backup copying of designated datasets stored within one or more data storage subsystems coupled to the data processing system during application execution within the data processing system, said computer program product comprising:*

*computer usable code means for suspending application execution within said data processing system at a first point in time, forming a dataset logical-to-physical storage system address concordance for said designated datasets and resuming application execution thereafter;*

*computer usable code means for physically backing up said designated datasets within said one or more storage subsystems on a scheduled or opportunistic basis by copying said designated datasets from said one storage subsystems to alternate storage subsystem locations;*

*computer usable code means for storing an indication of each application initiated update to said designated datasets which occurs after said first point in time;*

*computer usable code means for processing at said one or more storage subsystems any application initiated updates to uncopied designated datasets by buffering said updates, writing sidefiles of said designated datasets or portions thereof affected by said updates, writing said updates to said one or more storage subsystems, and copying on a scheduled or opportunistic basis said sidefiles to said alternate storage subsystem location in conjunction with said copied designated datasets from said one more storage subsystems in an order defined by said address concordance; and*

*computer usable code means for creating an incremental backup copy of said designated datasets at a designated time subsequent to said first point in time by copying only those designated datasets or portions thereof updated after said first point in time.*

*7. The computer program product for use in a data processing system for incremental backup copying of designated datasets stored within one or more storage subsystems coupled to said data processing system according to claim 6, wherein said step code means of creating an incremental backup copy of said designated datasets comprises:*

*computer usable code means for forming a second dataset logical-to-physical storage system address concordance at said designated time for each designated dataset or portion thereof updated after said first point in time;*

*computer usable code means for physically backing up said designated datasets updated after said first point in time on a scheduled or opportunistic basis by copying said designated datasets updated after said first point in time from said one or more storage subsystems to alternate storage subsystem locations; and*

*computer usable code means for processing at said one more storage subsystems any application initiated updates to uncopied designated datasets previously updated after said first point in time by buffering said updates, writing sidefiles of said designated datasets of portions thereof affected by said updates, writing said updates to said one or more storage subsystems, and copying on a scheduled or opportunistic basis said sidefiles to said alternate storage location in conjunction with said copied designated datasets in an order defined by said second address concordance.*

*8. A computer program product for use in a data processing system for incremental backup copying of designated datasets stored within one or more tracked cyclic storage devices coupled to the data processing system during application execution within the data processing system, said computer program product comprising:*

*computer usable code means for suspending application execution within said data processing system at a first point in time in response to a request for a backup copy of at least one dataset stored within said one or more tracked cyclic storage devices;*

*computer usable code means for forming a dataset and device track concordance for said at least one dataset and signaling said data processing system of the completion thereof;*

*computer usable code means for resuming application execution within said data processing system in response to said completion signal;*

*computer usable code means for copying said at least one dataset from said one or more tracked cyclic storage devices on a scheduled or opportunistic basis to an alternate storage subsystem;*

*computer usable code means for storing an indication of each application initiated update to any portion of said at least one dataset which occurs after said first point in time;*

*computer usable code means for processing application initiated updates to uncopied portions of said at least one dataset by buffering said updates, writing sidefiles of said affected portions of said at least one dataset, writing said updates to said one or more tracked cyclic storage devices and copying said sidefiles to said alternate storage location; and*

*computer usable code means for creating an incremental backup copy of said at least one dataset at a designated time subsequent to said first point in time by copying to said alternate storage system location only those portions of said at least one dataset which have been updated after said first point in time.*

*9. A computer program product for performing incremental backup copying of designated datasets stored within one or more storage subsystems coupled to a data processing subsystem during application execution within a data processing system, said computer program product comprising:*

*computer usable code means for suspending application execution within said data processing system at a first point in time;*

*computer usable code means for forming a dataset logical-to-physical storage system address concordance for said designated datasets at said first point in time;*

*computer usable code means for resuming application execution thereafter;*

*computer usable code means for physically backing up said designated datasets within said one or more storage subsystems on a scheduled or opportunistic basis by copying said designated datasets from said one storage subsystems to alternate storage subsystem locations;*

*computer usable code means for storing an indication of each application initiated update to said designated datasets which occurs after said first point in time;*

*computer usable code means for processing at said one or more storage subsystems any application initiated updates to uncopied designated datasets by buffering said updates, writing sidefiles of said designated datasets or portions thereof affected by said updates, writing said updates to said one or more storage subsystems, and copying on a scheduled or opportunistic basis said sidefiles to said alternate storage subsystem location in conjunction with said copied designated datasets from said one more storage subsystems in an order defined by said address concordance; and*

*computer usable means for creating an incremental backup copy of said designated datasets at a designated time subsequent to said first point in time by copying only those designated datasets or portions thereof updated after said first point in time.*

*10. A computer program product for permitting incremental backup copying of designated datasets stored within a storage subsystem with a data processing system, said computer program product comprising:*

*computer usable code means for forming a dataset logical-to-physical storage address concordance for said designated datasets within said storage subsystem at a first point in time;*

*computer usable code means for permitting copying of said designated datasets within said stored designated datasets on a scheduled or opportunistic basis by said data processing system;*

*computer usable code means for storing an indication of each update to a portion of said designated datasets which occurs after said first point in time;*

*computer usable code means for processing updates to uncopied portions of said designated datasets by buffering said updates, writing sidefiles of said uncopied portions of said designated datasets affected by said updates within said cache memory and writing said updates into said associated storage subsystems;*

*computer usable code means for permitting copying of said sidefiles by said data processing system; and*

*computer usable code means for permitting selective copying at a designated time after said first point in time of said portions of said designated datasets updated after said first point in time.*

* * * * *